United States Patent Office.

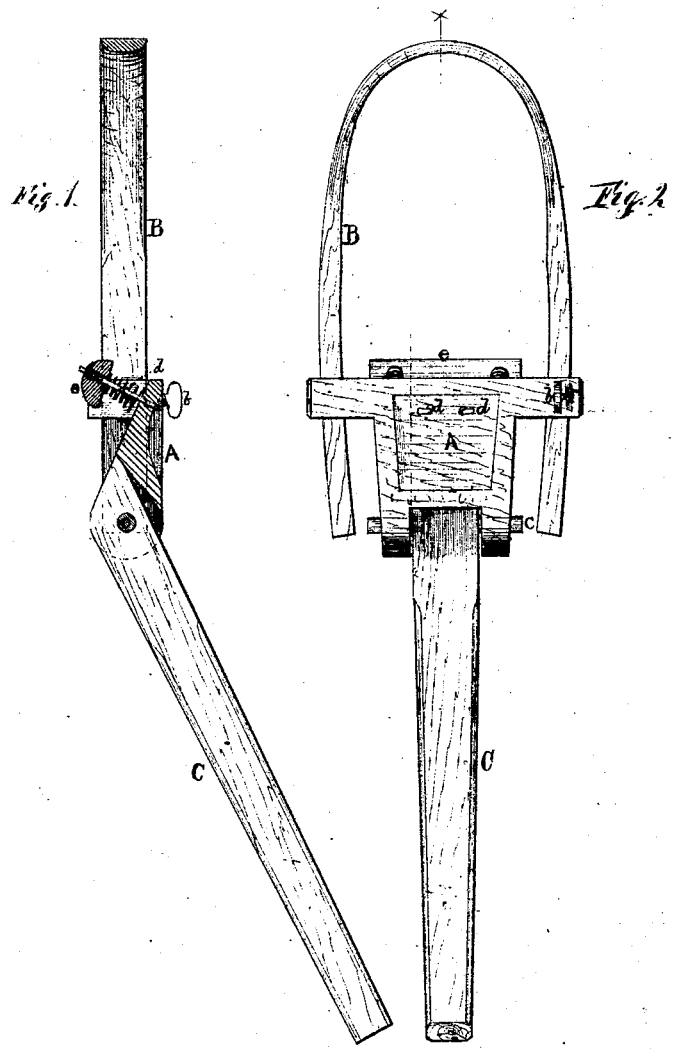

WARREN MILLER, OF GRANGER, OHIO.

Letters Patent No. 104,185, dated June 14, 1870.

IMPROVEMENT IN HORSE AND CATTLE-POKE.

The Schedule referred to in these Letters Patent and making part of the same.

I, WARREN MILLER, of Granger, in the county of Medina and State of Ohio, have invented certain Improvements in Cattle-Pokes, of which the following is a specification.

The nature of this invention relates to an improvement in cattle-pokes, and is designed to be more convenient and not liable to irritate the animal by the spikes pricking, as they do not protrude.

The bow is also readily adjusted to the side of the neck, and thus will not fall forward against the ears of the animal.

Figure 1 is a vertical section, taken on the line $x\ x$, fig. 2.

Figure 2 is a front view.

In the drawing—

A represents a cross-head cast in malleable iron, in suitable form and size to make it light, the sides having mortices to secure the ends of the bow B, and a set-screw; $b$, holding the bow at any desired point, thus making it adjustable to the neck of the animal.

The lower side of the cross-head is provided with a slot to receive the stale C, which is secured by a pin, $c$, it having sufficient play to allow the animal's head to reach the ground.

A recess is cut in the upper rear side of the cross-head, in which are placed the spikes $d\ d$.

There is also a guard-plate, $e$, covering the points of the spikes, which is held outward by the springs $f\ f$, the guard-plate resting against the breast of the animal.

This mode of construction permits an animal to roam about a field without the liability of the spikes scratching the breast and producing a soreness, but whenever the animal attempts to jump a fence the stale will strike and force the spikes sufficiently to cause the animal to desist.

I claim the cattle-poke, composed of a yoke, B, cross-head A, stale C, guard $e$, and springs and prickers $d$, when the yoke is adjustable, and the stale is so arranged as to allow the animal's head to reach the ground, all constructed, arranged, and operating substantially as described.

WARREN MILLER.

Witnesses:
GEO. W. TIBBITTS,
GEO. HESTER.